(12) United States Patent
Zhang et al.

(10) Patent No.: US 10,817,748 B2
(45) Date of Patent: Oct. 27, 2020

(54) METHOD AND APPARATUS FOR OUTPUTTING INFORMATION

(71) Applicant: Baidu Online Network Technology (Beijing) Co., Ltd., Beijing (CN)

(72) Inventors: Ye Zhang, Beijing (CN); Jun Wang, Beijing (CN); Liang Wang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 228 days.

(21) Appl. No.: 16/049,088

(22) Filed: Jul. 30, 2018

(65) Prior Publication Data

US 2019/0080203 A1    Mar. 14, 2019

(30) Foreign Application Priority Data

Sep. 11, 2017 (CN) .......................... 2017 1 0813687

(51) Int. Cl.
G06K 9/62 (2006.01)
G06T 7/246 (2017.01)
G06K 9/00 (2006.01)
G06T 7/73 (2017.01)

(52) U.S. Cl.
CPC ....... G06K 9/6215 (2013.01); G06K 9/00201 (2013.01); G06K 9/00805 (2013.01); G06K 9/627 (2013.01); G06K 9/6257 (2013.01); G06T 7/248 (2017.01); G06T 7/75 (2017.01); G06T 2207/10028 (2013.01); G06T 2207/20081 (2013.01); G06T 2207/30261 (2013.01)

(58) Field of Classification Search
CPC ............ G06K 9/6215; G06K 9/00201; G06K 9/00805; G06K 9/627; G06K 9/6257; G06K 9/6256; G06T 7/75; G06T 7/248; G06T 2207/20081; G06T 2207/10028; G06T 2207/30261
See application file for complete search history.

(56) References Cited

U.S. PATENT DOCUMENTS

| 9,052,721 | B1 * | 6/2015 | Dowdall | G05D 1/0272 |
| 9,824,453 | B1 * | 11/2017 | Collins | G06K 9/00671 |
| 10,192,115 | B1 * | 1/2019 | Sheffield | G06T 7/75 |
| 2017/0369051 | A1 * | 12/2017 | Sakai | B60W 10/04 |
| 2018/0341019 | A1 * | 11/2018 | Sakai | G01S 17/931 |

* cited by examiner

Primary Examiner — Carol Wang
(74) Attorney, Agent, or Firm — Miller, Matthias & Hull LLP (57) ABSTRACT

Embodiments of the present disclosure disclose a method and apparatus for outputting information. A specific embodiment of the method comprises: importing a first obstacle point cloud and a second obstacle point cloud having a to-be-calculated similarity into a pre-trained similarity calculation model to generate a similarity between the first obstacle point cloud and the second obstacle point cloud, the similarity calculation model being used for characterizing a corresponding relationship between the two obstacle point clouds and the similarity; and finally outputting the generated similarity. The embodiments have effectively reduced labor and time cost as result of determining various parameters for calculating the similarity.

17 Claims, 4 Drawing Sheets

METHOD AND APPARATUS FOR OUTPUTTING INFORMATION

CROSS-REFERENCE TO RELATED APPLICATIONS

This application claims priority to Chinese Patent Application No. 201710813687.4, filed with the State Intellectual Property Office of the People's Republic of China (SIPO) on Sep. 11, 2017, the content of which is incorporated herein by reference in its entirety.

TECHNICAL FIELD

The disclosure relates to the field of autonomous vehicle technology, specifically to the field of obstacle tracking technology, and more specifically to a method and apparatus for outputting information.

BACKGROUND

Autonomous vehicle is also known as a "wheeled mobile robot." Through comprehensive analysis and process performed by a driving control device equipped on the vehicle on the information collected by various sensors (e.g., a camera or a lidar), an autonomous vehicle may plan a route or control the driving. Most autonomous vehicles are provided with lidars to collect information from the environment. In the process of route planning and driving control of an autonomous vehicle, obstacle detection may be performed on each frame of laser point cloud (i.e., laser point cloud collected by a lidar in each sampling period) collected by the lidar, and then the detected obstacle is tracked in a laser point cloud frame sequence using a tracking algorithm based on the obstacle detection result. During this process, calculating similarities between obstacle point clouds detected by one frame of laser point cloud of the two frames of laser point cloud and obstacle point clouds detected by the other one frame of laser point cloud of the two frames of laser point cloud, and determining, by calculating the obtained similarities, the association between each of the obstacle point clouds detected by one frame of laser point cloud and obstacle point clouds detected by the other frame of laser point cloud, are important for realizing obstacle tracking.

However, at present, similarities between different obstacle point clouds are calculated mostly by adopting an experience-dependent method: manually determining parameter values of various parameters required for extracting the characteristics of the obstacle point clouds and calculating the similarity between the extracted characteristics. Accordingly, high labor cost and time cost are there as result of determining various parameters for calculating the similarity.

SUMMARY

An object of the embodiments of the present disclosure is to provide an improved method and apparatus for outputting information, to solve the technical problems mentioned in the background part.

In a first aspect, an embodiment of the present disclosure provides a method for outputting information, the method including: importing a first obstacle point cloud and a second obstacle point cloud having a to-be-calculated similarity into a pre-trained similarity calculation model to generate a similarity between the first obstacle point cloud and the second obstacle point cloud, the similarity calculation model being used for characterizing a corresponding relationship between the similarity and the two obstacle point clouds; outputting the generated similarity; the similarity calculation model being obtained through following training: acquiring an initial similarity calculation model and a predetermined sample data set, each piece of sample data including the two obstacle point clouds and the similarity between the two obstacle point clouds; training the initial similarity calculation model using a machine learning method with the two obstacle point clouds of each piece of sample data in the sample data set as input data, and the similarities in each piece of sample data as corresponding output data; and defining the trained initial similarity calculation model as the pre-trained similarity calculation model.

In some embodiments, the sample data set is obtained through: acquiring testing obstacle point clouds and annotated obstacle point clouds corresponding to each frame of sample laser point, cloud in a sample laser point cloud frame sequence, wherein an annotated obstacle point cloud comprises an obstacle identifier indicating a physical obstacle characterized by the annotated obstacle point cloud; generating an obstacle identifier set containing different obstacle identifiers in obstacle identifiers of the annotated obstacle point clouds corresponding to the each frame of sample laser point cloud; determining, for each of the testing obstacle point clouds corresponding to a frame of sample laser point cloud, a matching degree vector having a preset number of dimensions and corresponding to a testing obstacle point cloud based on a similarity between the testing obstacle point cloud and each of the annotated obstacle point clouds corresponding to the frame of sample laser point cloud, the preset number of dimensions being a number of the obstacle identifiers in the obstacle identifier set, a value of an element in the matching degree vector being a matching degree between the testing obstacle point cloud and a physical obstacle indicated by an obstacle identifier in the obstacle identifier set; and generating the two obstacle point clouds and the similarity in the piece of sample data. In the sample data set based on a similarity between matching degree vectors of each of testing point cloud obstacles corresponding to one of two frames of sample point cloud and matching degree vectors of each of testing point cloud obstacles corresponding to the other one of the two frames of sample point cloud, the two frames of sample point cloud having a location difference in the sample laser point cloud frame sequence being smaller than or equal to a preset number.

In some embodiments, the generating the two obstacle point clouds and the similarity in the piece of sample data in the sample data set based on a similarity between matching degree vectors of each of the testing point cloud obstacles corresponding to one of the two frames of sample point cloud and matching degree vectors of each of the testing point cloud obstacles corresponding to the other one of the two frames of sample point cloud, the two frames of sample point cloud having a location difference in the sample laser point cloud frame sequence being smaller than or equal to a preset number comprises: generating, for the two frames of sample laser point cloud having the location difference in the sample laser point cloud frame sequence being smaller than the preset number, a piece of sample data for a first testing obstacle point cloud of at least one testing obstacle point cloud corresponding to the one of the two frames of sample laser point cloud and a second testing obstacle point cloud of the at least one testing obstacle point cloud corresponding to the other one of the two frames of sample laser point cloud, defining the first testing obstacle point cloud and the second testing obstacle point cloud as the two obstacle point clouds in the generated sample data, and defining the similarity between the matching degree vector corresponding to the first testing obstacle point cloud and a matching degree vector corresponding to the second testing obstacle point cloud as the similarity of the generated sample data; and defining the predetermined sample data set based on the generated at least one piece of sample data.

In some embodiments, a similarity between a testing obstacle point cloud and an annotated obstacle point cloud is a Jaccard similarity coefficient between the testing obstacle point cloud and the annotated obstacle point cloud.

In some embodiments, the similarity between the matching degree vector corresponding to the first testing obstacle point cloud and the matching degree vector corresponding to the second testing obstacle point cloud is an inner product, a Jaccard similarity coefficient or a cosine similarity between the matching degree vector corresponding to the first testing obstacle point cloud and the matching degree vector corresponding to the second testing obstacle point cloud.

In some embodiments, the sample data set includes a positive sample data set having a similarity greater than a preset similarity threshold and a negative sample data set having a similarity smaller than or equal to the preset similarity threshold; and the defining the predetermined sample data set based on the generated at least one piece of sample data includes: generating the negative sample data set based on sample data having a similarity smaller than or equal to the preset, similarity threshold of the generated at least one piece of sample data; and generating the positive sample data set based on sample data having a similarity greater than the preset similarity threshold of the generated at least one piece of sample data.

In some embodiments, the generating a positive sample data set based on sample data having a similarity greater than the preset similarity threshold of the generated at least one piece of sample data comprises: generating the positive sample data set using the sample data having the similarity greater than the preset similarity threshold of the generated at least one piece of sample data; sorting positive sample data in the positive sample data set in an ascending order of the similarity in the sample data; calculating fractile distribution of the similarity of the positive sample data using a preset fractile based on a sorting result, and generating fractile results of the preset fractile; and updating the similarity of the corresponding positive sample data in the positive sample data set using the generated fractile results of the preset fractile.

In some embodiments, the generating the negative sample data set based on sample data having a similarity smaller than or equal to the preset similarity threshold of the generated at least one piece of sample data comprises: generating the negative sample data set using the sample data having the similarity smaller than or equal to the preset similarity threshold of the generated at least one piece of sample data; and deleting negative sample data having a low matching degree from the negative sample data set, wherein a characteristic point distance between two obstacle point clouds in the negative sample data having a low matching degree is greater than a preset distance threshold, or eigenvalues of a preset characteristic of the two obstacle point clouds in the negative sample data having a low matching degree are different, and the characteristic point distance between the two obstacle point clouds is a distance between a coordinate of a characteristic point corresponding to one of the two obstacle point clouds and a coordinate of a characteristic point corresponding to the other one of the two obstacle point clouds.

In a second aspect, an embodiment of the present disclosure provides an apparatus for outputting information, the apparatus including: a generation unit, configured for importing a first obstacle point cloud and a second obstacle point cloud having a to-be-calculated similarity into a pre-trained similarity calculation model to generate a similarity between the first obstacle point cloud and the second obstacle point cloud, the similarity calculation model being used for characterizing a corresponding relationship between the similarity and the two obstacle point clouds; and an output unit, configured for outputting the generated similarity; the similarity calculation model being obtained by a training unit, the training unit including: a first acquisition module, configured for acquiring an initial similarity calculation model and a predetermined sample data set, each piece of sample data including the two obstacle point clouds and the similarity between the two obstacle point clouds; a training module, configured for training the initial similarity calculation model using a machine learning method with the two obstacle point clouds of each piece of sample data in the sample data set as input data, and the similarities in each piece of sample data as corresponding output data; and a first determining module, configured for defining the trained initial similarity calculation model as the pre-trained similarity calculation model.

In some embodiments, the sample data set is obtained by a determining unit, the determining unit including: a second acquisition module, configured for acquiring testing obstacle point clouds and annotated obstacle point clouds corresponding to each frame of sample laser point cloud in a sample laser point cloud frame sequence, wherein an annotated obstacle point cloud comprises an obstacle identifier indicating a physical obstacle characterized by the annotated obstacle point cloud; a first generation module, configured for generating an obstacle identifier set containing different obstacle identifiers in obstacle identifiers of the annotated obstacle point clouds corresponding to the each frame of sample laser point cloud; a second determining module, configured for determining, for each of the testing obstacle point clouds corresponding to a frame of sample laser point cloud frame, a matching degree vector having a preset number of dimensions and corresponding to the each testing obstacle point cloud based on a similarity between the testing obstacle point cloud and each of the annotated obstacle point clouds corresponding to the frame of sample laser point cloud, the preset number of dimensions being a number of the obstacle identifiers in the obstacle identifier set, a value of an element in the matching degree vector being a matching degree between the testing obstacle point cloud and a physical obstacle indicated by an obstacle identifier in the obstacle identifier set; and a second generation module, configured for generating the two obstacle point clouds and the similarity in each piece of sample data in the sample data set based on a similarity between matching degree vectors of each of testing point cloud obstacles corresponding to one of two frames of sample point cloud and matching degree vectors of each of testing point cloud obstacles corresponding to the other one of the two frames of sample point cloud, the two frames of sample point cloud having a location difference in the sample laser point cloud frame sequence being smaller than or equal to a preset number.

In some embodiments, the second generation module includes: a first determining submodule, configured for generating, for the two frames of sample laser point cloud having the location difference in the sample laser point cloud frame sequence being smaller than the preset number, a piece of sample data for a first testing obstacle point cloud of at least one testing obstacle point cloud corresponding to the one of the two frames of sample laser point cloud and a second testing obstacle point cloud of the at least one testing obstacle point cloud corresponding to the other one of the two sample laser point cloud frames, defining the first testing obstacle point cloud and the second testing obstacle point cloud as the two obstacle point clouds in the generated sample data, and defining the similarity between the matching degree vector corresponding to the first testing obstacle point cloud and a matching degree vector corresponding to the second testing obstacle point cloud as the similarity of the generated sample data; and a second determining submodule, configured for defining the predetermined sample data set based on the generated at least one piece of sample data.

In some embodiments, a similarity between the testing obstacle point cloud and the annotated obstacle point cloud is a Jaccard similarity coefficient between the testing obstacle point cloud and the annotated obstacle point cloud.

In some embodiments, the similarity between the matching degree vector corresponding to the first testing obstacle point cloud and the matching degree vector corresponding to the second testing obstacle point cloud is an inner product, a Jaccard similarity coefficient or a cosine similarity degree between the matching degree vector corresponding to the first testing obstacle point cloud and the matching degree vector corresponding to the second testing obstacle point cloud.

In some embodiments, the sample data set includes a positive sample data set having a similarity greater than a preset similarity threshold and a negative sample data set having a similarity smaller than or equal to the preset similarity threshold; and the second determining submodule is further used for: generating a negative sample data set based on sample data having a similarity smaller than or equal to the preset similarity threshold of the generated at least one piece of sample data; and generating a positive sample data set based on sample data having a similarity greater than the preset similarity threshold of the generated at least one piece of sample data.

In some embodiments, the second determining submodule is further used for: generating the positive sample data set using the sample data having the similarity greater than the preset similarity threshold of the generated at least one piece of sample data; sorting positive sample data in the positive sample data set in an ascending order of the similarity in the sample data; calculating fractile distribution of the similarity degree of the positive sample data using a preset fractile based on a sorting result, and generating fractile results of the preset fractile; and updating the similarity of the corresponding positive sample data in the positive sample data set using the generated fractile results of the preset fractile.

In some embodiments, the second determining submodule is further used for: generating the negative sample data set using the sample data having the similarity smaller than or equal to the preset similarity threshold of the generated at least one piece of sample data; and deleting negative sample data having a low matching degree from the negative sample data set, wherein a characteristic point distance between two obstacle point clouds in the negative sample data having a low matching degree is greater than a preset distance threshold, or eigenvalues of a preset characteristic of the two obstacle point clouds in the negative sample data having a low matching degree are different, and the characteristic point distance between the two obstacle point clouds is a distance between a coordinate of characteristic point corresponding to one of the two obstacle point clouds and a coordinate of a characteristic point corresponding to the other one of the two obstacle point clouds.

In a third aspect, an embodiment of the present disclosure provides a driving control device, the driving control device including: one or more processors; and a memory for storing one or more programs, the one or more programs enabling, when executed by the one or more processors, the one or more processors to implement the method according to any one of the implementations in the first aspect.

In a fourth aspect, an embodiment of the disclosure provides a computer readable storage medium storing a computer program therein, where the computer program implements, when executed by a processor, the method according to any one of the implementations in the first aspect.

The method and apparatus for outputting information provided by the embodiments of the present disclosure import a first obstacle point cloud and a second obstacle point cloud having a to-be-calculated similarity into a pre-trained similarity e calculation model to generate a similarity between the first obstacle point cloud and the second obstacle point cloud, outputting the generated similarity, the similarity calculation model being obtained through following training: firstly acquiring an initial similarity calculation model and a predetermined sample data set, each piece of sample data including the two obstacle point clouds and the similarity between the two obstacle point clouds, training the initial similarity calculation model using a machine learning method with the two obstacle point clouds of each piece of sample data in the sample data set as input data, and the similarities in each piece of sample data as corresponding output data; and defining the trained initial similarity calculation model as the pre-trained similarity calculation model, thereby effectively reducing labor and time cost problems as a result of determining various parameters for calculating a similarity.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
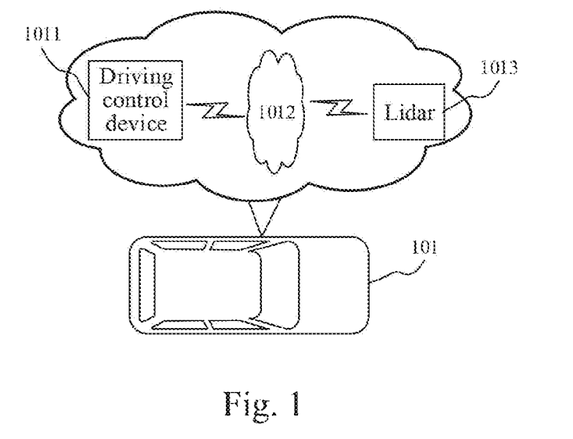
FIG. 1 is a structural diagram of an exemplary system in which the disclosure may be applied.

FIG. 1 shows an exemplary system architecture 100 in which a method for outputting information or an apparatus for outputting information according to the embodiments of the present disclosure may be applied.

As shown in FIG. 1, the system architecture 100 may include an autonomous vehicle 101.

A driving control device 1011, a network 1012 and a lidar 1013 may be installed in the autonomous vehicle 101. The network 1012 is used for providing a communication link medium between the driving control device 1011 and the lidar 1013. The network 1012 may include a variety of connection types, such as a wired communication link, a wireless communication link, or a fiber cable.

The driving control device (also known as vehicle-mounted controller) 1011 is responsible for intelligent control of the autonomous vehicle 101. The driving control device 1011 may be a separate controller, such as a programmable logic controller (PLC), a single chip microcomputer or an industrial control machine; may also be other equipment including of an electronic component having an input/output port and a computing control function; and may also be a computer device in which a vehicle driving control application is installed.

It should be noted that in practice, at least one sensor, e.g., a camera, a gravity sensor or a wheel speed sensor, may be further installed in the autonomous vehicle 101. In some cases, a Global Navigation Satellite System (GNSS) device, a Strap-down Inertial Navigation System (SINS) or the like may be further installed in the autonomous vehicle 101.

It should be noted that the method for outputting information provided by the embodiments of the present disclosure is generally executed by the driving control device 1011. Accordingly, the apparatus for outputting information is generally set in the driving control device 1011.

It should be appreciated that the numbers of driving control devices, networks and lidars in FIG. 1 are only illustrative. There may be any number of driving control devices, networks and lidars based on implementation needs.

Figure 2:
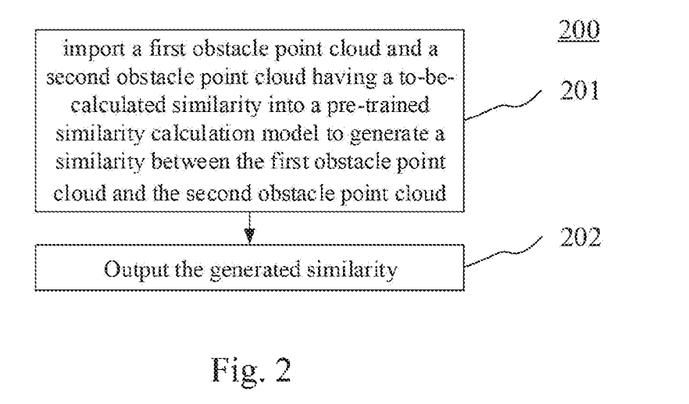
FIG. 2 is a flow chart of a method for outputting information according to an embodiment of the present disclosure.

Further referring to FIG. 2, which shows a flow 200 of a method for outputting information according to an embodiment of the present disclosure. The method for outputting information includes:

Step 201: importing a first obstacle point cloud and a second obstacle point cloud having a to-be-calculated similarly into a pre-trained similarity calculation model to generate a similarity between the first obstacle point cloud and the second obstacle point cloud.

In the present embodiment, an electronic device (e.g., a driving control device as shown in FIG. 1) in which a method for outputting information runs may import, when it needs to calculate a similarity between two obstacle point clouds, a first obstacle point cloud and a second obstacle point cloud having a to-be-calculated similarity into a pre-trained similarity calculation model to generate a similarity between the first obstacle point cloud and the second obstacle point cloud.

Here, the obstacle may include a static obstacle and a moving obstacle. For example, the static obstacle may be a tree, a lost thing, a warning sign, a traffic sign, a road barrier or the like, while the moving obstacle may be a pedestrian, an animal, a vehicle, or the like. An autonomous vehicle needs to avoid static obstacles and moving obstacles during driving.

During the driving of the autonomous vehicle, a lidar installed on the autonomous vehicle may collect information of the outside environment in real time, generate a laser point cloud, and transmit the laser point cloud to the electronic device. The electronic device may analyze and process the received laser point cloud to identify and track an obstacle in the environment around the vehicle, and predict the travel route of the obstacle for further path planning and driving control of the vehicle.

Therefore, firstly, the electronic device may test each frame of the received laser point cloud to distinguish between which laser point data in the laser point cloud are used for describing an obstacle, which laser point data are used for describing a non-obstacle (e.g., a driving area), and which laser point data are used for describing a given obstacle. Here, the obstacle point cloud may be relevant characteristic information characterizing an obstacle. As an example, the obstacle point cloud may include laser point cloud data or characteristic information of an obstacle extracted based on the laser point cloud data. For example, the characteristic information may include location and length information of a bounding box of an obstacle; length, width and height information of the obstacle; volume of the obstacle, or the like. Of course, the characteristic information may further include other characteristic information of the obstacle. That is, after receiving a frame of laser point cloud, the electronic device needs to analyze and process the frame of laser point cloud, and generate at least one obstacle point, cloud characterizing the obstacle.

Secondly, the electronic device can associate (or match) obstacle point clouds in two adjacent frames of laser point cloud to track an obstacle. That is, an obstacle point cloud A obtained by testing a current frame of laser point cloud and an obstacle point cloud B obtained by testing a frame of laser point cloud immediately prior to the current frame of laser point cloud are used for describing a given obstacle C in the physical world, then the obstacle point cloud A and the obstacle point cloud B can be associated to track the obstacle C.

It needs to calculate a similarity between the obstacle point cloud A and the obstacle point, cloud B to determine whether the obstacle point cloud A and the obstacle point cloud B are used to characterize the given obstacle C in the physical world. Under the circumstance, the electronic device may use the obstacle point cloud A and the obstacle point cloud B respectively as a first obstacle point cloud and a second obstacle point cloud having a to-be-calculated similarity, import the first obstacle point cloud and the second obstacle point cloud into a pre-trained similarity calculation model to generate a similarity between the first obstacle point cloud and the second obstacle point cloud, the similarity, calculation model being used for characterizing corresponding relationship between two obstacle point clouds and the similarity between the two obstacle point clouds.

In the present embodiment, the similarity calculation model may be obtained by the electronic device through training, and may also be obtained by other electronic device (e.g., a cloud server providing support for an autonomous vehicle) in communication connection with the electronic device through pre-training. It may be appreciated that in practice, the similarity calculation model is usually obtained by other electronic device in communication connection with the electronic device through pre-training.

In the present embodiment, a model parameter of the similarity calculation model may be stored locally in the electronic device or stored in other electronic device in communication connection with the electronic device. Thus, the electronic device may locally or remotely acquire the model parameter of the similarity calculation model from the other electronic device, and further the importing the first obstacle point cloud and the second obstacle point cloud into a pre-trained similarity calculation model to generate a similarity between the first obstacle point cloud and the second obstacle point cloud may be implemented.

In the present embodiment, the similarity calculation model may be obtained through following training:

firstly, acquiring an initial similarity calculation model and a predetermined sample data set.

Here, the initial similarity calculation model may be any machine learning model. As an example, the initial similarity calculation model may be an artificial neural network model. Model parameters of the initial similarity calculation model may be preset. For example, the model parameters can be set randomly.

Here, each piece of sample data in the sample data set includes two obstacle point clouds and a similarity between the two obstacle point clouds. Various implementations may be employed to predetermine a sample data set. As an example, firstly, a training laser point cloud frame sequence may be acquired, and each frame of sample laser point cloud in the training sample laser point cloud frame sequence may be pre-annotated with at least one obstacle point cloud, wherein each obstacle point cloud includes an obstacle identifier indicating a physical obstacle characterized by the obstacle point cloud. Then, for two frames of sample laser point cloud having the location difference in the training laser point cloud frame sequence being smaller than the preset number (for example, 1), a piece of sample data containing a third obstacle point cloud in one frame of laser point cloud and a fourth obstacle point cloud in the other frame of laser point cloud is generated, the third obstacle point cloud and the fourth obstacle point cloud are defined as the two obstacle point clouds in the generated sample data. Moreover, if the third obstacle point cloud and the fourth obstacle point cloud have a same obstacle identifier, i.e., the third obstacle point cloud and the fourth obstacle point cloud are used for characterizing a given obstacle in the physical world, then the similarity of the generated sample data is set as a preset maximum similarity threshold (for example, set as 1), while if the third obstacle point cloud and the fourth obstacle point cloud have different obstacle identifiers, i.e., the third obstacle point cloud and the fourth obstacle point cloud are used for characterizing different obstacles in the physical world, then the similarity of the generated sample data is set as a preset minimum similarity threshold (for example, set as 0). Finally, the generated at least one piece of sample data is used as a predetermined sample data set.

Then, the initial similarity calculation model is trained using a machine learning method with the two obstacle point clouds of each piece of sample data in the sample data set as input data, and the similarity in each piece of sample data as corresponding output data.

Here, the process of training the initial similarity calculation model by using the sample data set is the process of further optimizing the model parameters of the initial similarity calculation model, and how to specifically optimize the model parameters is an existing technology which is widely used and researched at present and would not be repeated any more here.

Finally, the trained initial similarity calculation model is defined as the pre-trained similarity calculation model.

Step 202: outputting the generated similarity.

In the present embodiment, the electronic device can output the generated similarity in step 201.

In the present embodiment, the electronic device calculates the similarity between the first obstacle point cloud and the second obstacle point cloud to subsequently associate obstacle point clouds in the two laser point cloud frames, and then identify and track the obstacle. Therefore, the electronic device can output the similarity between the first obstacle point cloud and the second obstacle point cloud generated in the step 201 to a relevant function module (e.g., a program function module or a hardware function module) that requires the similarity.

Figure 3:
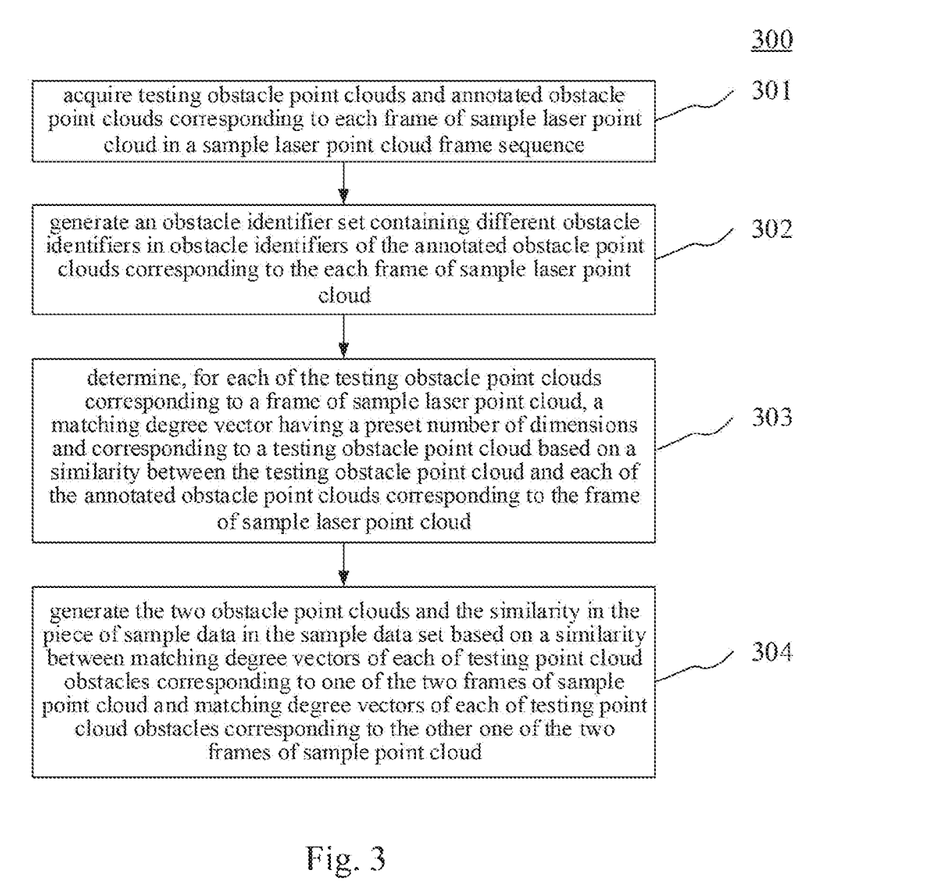
FIG. 3 is a flow chart of a determining step according to an embodiment of the present disclosure.

In some optional implementations of the present embodiment, the defining a sample data set may also be obtained by a following defining step 300. Specifically referring to FIG. 3. FIG. 3 shows step 301 to step 303 included in the defining step 300:

Step 301: acquiring testing obstacle point clouds and annotated obstacle point clouds corresponding to each frame of sample laser point cloud in a sample laser point cloud frame sequence.

Here, each frame of sample laser point cloud in the acquired sample laser point cloud frame sequence can correspond to at least one testing obstacle point cloud and/or at least one annotated obstacle point cloud, where the testing obstacle point cloud may be an obstacle point cloud obtained by testing each frame of sample laser point cloud by using a preset obstacle testing algorithm. The annotated obstacle point cloud includes an obstacle identifier indicating a physical obstacle characterized by an annotated obstacle point cloud, i.e., each annotated obstacle point cloud of each frame of sample laser point cloud is annotated with an obstacle identifier characterized by each annotated obstacle point cloud. Thus, for two adjacent frames of sample laser point cloud in the acquired sample laser point cloud frame sequence, if the obstacle identifier of an annotated obstacle point cloud $P_1$ in one of the frames of sample laser point cloud is identical to the obstacle identifier of an annotated obstacle point cloud $P_2$ in the other frame of sample laser point cloud, it shows that the annotated obstacle point cloud $P_1$ and the annotated obstacle point cloud $P_2$ are used for characterizing a given obstacle in the physical world. Otherwise, if the obstacle identifier of the annotated obstacle point cloud P1 one of the frames of sample laser point cloud is different from the obstacle identifier of the annotated obstacle point cloud P2 in the other frame of sample laser point cloud, it shows that the annotated obstacle point cloud $P_1$ and the annotated obstacle point cloud $P_2$ are used for characterizing different obstacles in the physical world.

Here, the testing obstacle point cloud and the annotated obstacle point cloud both can include relevant characteristic information characterizing obstacles. As an example, the testing obstacle point cloud and the annotated obstacle point cloud may include laser point cloud data or characteristic information of an obstacle extracted based on the laser point cloud data. For example, the characteristic information may include location and length information of a bounding box of an obstacle; length, width and height information of the obstacle; volume of the obstacle, or the like. Of course, the characteristic information may further include other characteristic information of the obstacle.

Step 302: generating an obstacle identifier set containing different obstacle identifiers in the obstacle identifiers of the annotated obstacle point clouds corresponding to the each frame of sample laser point cloud.

Here, identical obstacle identifiers may exist in the obstacle identifiers of each of the annotated obstacle point clouds corresponding to each of the frames of sample laser point cloud Therefore, repeated obstacle identifiers may be deleted, and the obstacle identifier set containing different obstacle identifiers in the obstacle identifiers of the annotated obstacle point cloud corresponding to a frame of sample laser point cloud may be generated. The obstacle identifiers in the formed obstacle identifier set include obstacle identifiers of the acquired annotated obstacle point clouds corresponding to each frame of sample laser point cloud frame in the sample laser point cloud frame sequence.

For example, the acquired sample laser point cloud frame sequence includes three frames of sample laser point cloud $F_1$, $F_2$ and $F_3$: the obstacle identifiers of three annotated obstacle point clouds corresponding to the first frame of sample laser point cloud F1 are: $B_1$, $B_2$ and $B_3$; the obstacle identifiers of four annotated obstacle point clouds corresponding to the second sample laser point cloud frame $F_2$ are: $B_2$, $B_3$, $B_4$ and $B_5$; and the obstacle identifiers of four annotated obstacle point clouds corresponding to the third sample laser point cloud frame $F_3$ are: $B_2$, $B_4$ and $B_6$, thereby the obstacle identifier set is: $B_1$, $B_2$, $B_3$, $B_4$, $B_5$ and $B_6$.

Step 303: determining, for each of the testing obstacle point clouds corresponding to a frame of sample laser point cloud, a matching degree vector having a preset number of dimensions and corresponding to the testing obstacle point cloud based on a similarity between the testing obstacle point cloud and each of the annotated obstacle point clouds corresponding to the frame of sample laser point cloud.

Here, the preset number of dimensions is the number of the obstacle identifiers in the obstacle identifier set generated in the step 302, that is, the preset number of dimensions is the sum of obstacles characterized by the acquired annotated obstacle point clouds corresponding to each frame of sample laser point cloud in the sample laser point cloud frame sequence.

Here, the value of an element in the matching degree vector is a matching degree between the testing obstacle point cloud and a physical obstacle indicated by an obstacle identifier in the obstacle identifier set.

Specifically, for each testing obstacle point cloud corresponding to a frame of sample laser point cloud, and for each annotated obstacle point cloud corresponding to the frame or sample laser point cloud, a similarity between the testing obstacle point cloud and the annotated obstacle point cloud may be defined as the value of the element corresponding to the obstacle identifier of the annotated obstacle point cloud in a matching degree vector corresponding to the each testing obstacle point cloud, and the value of the element corresponding to a non-occurring obstacle identifier in a matching degree vector corresponding to the each testing obstacle point cloud may be set as a preset minimum matching degree, wherein the non-occurring obstacle identifier is an obstacle identifier other than an obstacle identifier of an annotated obstacle point cloud corresponding to the each frame of sample laser point cloud in the obstacle identifier set.

For example: assume that a sample laser point cloud frame sequence totally includes 1000 sample laser point cloud frames, the first frame of sample laser point cloud corresponds to $C_1$ testing obstacle point clouds and Li annotated obstacle point clouds, the second frame of sample laser point cloud corresponds to $C_2$ testing obstacle point clouds and L2 annotated obstacle point clouds, . . . , and the 1000th frame of sample laser point cloud corresponds to $C_{1000}$ testing obstacle point clouds and $L_{1000}$ annotated obstacle point clouds, but there are repeated obstacles characterized by the annotated obstacle point clouds corresponding to different frames of sample laser point cloud. Therefore, the number of obstacle identifiers in the formed obstacle identifier set containing $(L_1+L_2+ \ldots +L_{1000})$ annotated obstacle point clouds is much smaller than $(L_1+L_2+ \ldots +L_{1000})$. For example, $(L_1+L_2+ \ldots +L_{1000})=10,000$, while M=100, then the preset number of dimensions here is 100, instead of 10,000, i.e., the preset number of dimensions is N, rather than $(L_1+L_2+ \ldots +L_{1000})$. Here, an M.-dimensional matching degree vector $V_{1,1}$ may be determined for the $1^{st}$ testing obstacle point cloud of the C1 testing obstacle point clouds corresponding to the first frame of sample laser point cloud, wherein the similarity between the $1^{st}$ testing obstacle point cloud and the each annotated obstacle point cloud in the L1 annotated obstacle point clouds may be determined as the value of an element corresponding to an obstacle identifier of the each annotated obstacle point cloud in the LI annotated obstacle point clouds in $V_{1,1}$, and the value of an element corresponding to a non-occurring obstacle identifier in $V_{1,1}$ may be set as a preset minimum matching degree, e.g., set as 0. The non-occurring obstacle identifier is an obstacle identifier other than obstacle identifiers of the L1 annotated obstacle point clouds in the obstacle identifier set. Similarly, an M.-dimensional matching degree vector $V_{1,2}$ may be determined for the $2^{nd}$ testing obstacle point cloud of the $C_1$ testing obstacle point clouds corresponding to the first frame of sample laser point cloud, . . . , and an M-dimensional matching degree vector $V_1$, $c_1$ may be determined for the $C_1$ testing obstacle point cloud of the $C_1$ testing obstacle point clouds corresponding to the first frame of sample laser point cloud, to generate $C_1$ M-dimensional matching degree vectors $V_{1,1}, V_{2,1}, \ldots, V_1$, $c_1$ for the first frame of sample laser point cloud. Similarly, $C_2$ N-dimensional matching degree vectors $V_{2,1}, V_{2,1}, \ldots, V_2, c_1, \ldots$ are generated for the second frame of sample laser point cloud, and $C_{1000}$ M-dimensional matching degree vectors $V_{1000,1}, V_{1000,1}, \ldots, V_{1000}, C_{1000}$ are generated for the 1000th frame of sample laser point cloud.

Here, the similarity between a testing obstacle point cloud and an annotated obstacle cloud point may be calculated using various implementations. For example, when a testing obstacle point cloud and an annotated obstacle cloud point include three-dimensional shape information of an obstacle, a similarity between shape information included in the testing obstacle point cloud and three-dimensional shape information included in the annotated obstacle cloud point may be calculated. For example, for cuboids, the calculated ratio of volumes of the two cuboids can be took as the similarity, while for conoids, the calculated average value of a ratio of heights of two conoids and a ratio of radii of the two conoids can be took as the similarity.

In some optional implementations, a similarity between a testing obstacle point cloud and an annotated obstacle point cloud may be a Jaccard similarity coefficient between the testing obstacle point cloud and the annotated obstacle point cloud.

For example, when a testing obstacle point cloud and an annotated obstacle point cloud include a plurality of laser point data, the Jaccard coefficient between the testing obstacle point cloud and the annotated obstacle point cloud may be calculated based on the following formula:

$$J(P_C, P_L) = \frac{|P_C \cap P_L|}{|P_C \cup P_L|} \qquad \text{(Formula 1)}$$

wherein $P_C$ denotes a plurality of laser point data included in a testing obstacle point cloud;

$P_L$ denotes a plurality of laser point data included in an annotated obstacle point cloud;

$|P_C \cap P_L|$ denotes the number of laser point data in the intersection of the plurality of laser point data included in the testing obstacle point cloud and the plurality of laser point data included in the annotated obstacle point cloud;

$|P_C \cup P_L|$ denotes the number of laser point data in a union of the plurality of laser point data included in the testing obstacle point cloud and the plurality of laser point data included in the annotated obstacle point cloud; and $J(P_C, P_L)$ is a Jaccard similarity coefficient between the testing obstacle point cloud and the annotated obstacle point cloud.

For example, when a testing obstacle point cloud and an annotated obstacle point cloud respectively includes a three-dimensional bounding box, here the three-dimensional bounding box of the testing obstacle point cloud may be a smallest circumscribed cuboid of three-dimensional coordinates of a piece of laser point data included in the testing obstacle point cloud. Similarly, the three-dimensional bounding box of the annotated obstacle point cloud may be a smallest circumscribed cuboid of three-dimensional coordinates of a piece of laser point data included in the annotated obstacle point cloud. Therefore, the Jaccard similarity coefficient between the testing obstacle point cloud and the annotated obstacle point cloud can be calculated based on the following formula:

$$J(B_C, B_L) = \frac{|B_C \cap B_L|}{|B_C \cup B_L|} \qquad \text{(Formula 2)}$$

wherein $B_c$ denotes bounding box information of the three-dimensional bounding box included in the testing obstacle point cloud, for example, may be coordinates of eight vertices of a cuboid corresponding to the three-dimensional bounding box;

$B_L$ denotes bounding box information of the three-dimensional bounding box included in an annotated obstacle point cloud, for example, may be coordinates of eight vertices of a cuboid corresponding to the three-dimensional bounding box;

$|B_C \cap B_L|$ denotes a volume corresponding to the intersection of the three-dimensional bounding box included in the testing obstacle point cloud and the three-dimensional bounding box included in the annotated obstacle point cloud;

$|B_C \cup B_L|$ denotes a volume corresponding to the union of the three-dimensional bounding box included in the testing obstacle point cloud and the three-dimensional bounding box included in the annotated obstacle point cloud; and $J(B_C, B_L)$ is a Jaccard similarity coefficient between the testing obstacle point cloud and the annotated obstacle point cloud.

For example, when the testing obstacle point cloud and the annotated obstacle point cloud respectively includes a two-dimensional bounding box, here the two-dimensional bounding box of the testing obstacle point cloud may be a smallest circumscribed rectangle of two-dimensional coordinates (e.g., plane coordinates) of piece of laser point data included in the testing obstacle point cloud. Similarly, the two-dimensional bounding box of the annotated obstacle point cloud may be a smallest circumscribed rectangle of two-dimensional coordinates (e.g., plane coordinates) of a piece of laser point data included in the annotated obstacle point cloud. Therefore, the Jaccard similarity coefficient between the testing obstacle point cloud and the annotated obstacle point cloud can be calculated based on the following formula:

$$J(R_C, R_L) = \frac{|R_C \cap R_L|}{|R_C \cup R_L|} \qquad \text{(Formula 3)}$$

wherein $R_C$ denotes bounding box information of the two-dimensional bounding box included in the testing obstacle point cloud, example, may be coordinates of four vertices of the rectangle corresponding to the two-dimensional bounding box;

$R_L$ denotes bounding box information of the two-dimensional bounding box included in the annotated obstacle point cloud, for example, may be coordinates of four vertices of the rectangle corresponding to the two-dimensional bounding box;

$|R_C \cap R_L|$ denotes an area corresponding to the intersection of the two-dimensional bounding box included in the testing obstacle point cloud and the two-dimensional bounding box included in the annotated obstacle point cloud;

$|R_C \cup R_L|$ denotes an area corresponding to the union of the two-dimensional bounding box included in the testing obstacle point cloud and the two-dimensional bounding box included in the annotated obstacle point cloud; and $J(R_C, R_L)$ is a Jaccard similarity coefficient between the testing obstacle point cloud and the annotated obstacle point cloud.

For example, when a testing obstacle point cloud and an annotated obstacle point cloud respectively includes a three-dimensional convex hull, here the three-dimensional convex hull of the testing obstacle point cloud may be a convex hull of three-dimensional coordinates of a piece of laser point data included in the testing obstacle point cloud. Similarly, the three-dimensional convex hull of the annotated obstacle point cloud may be a convex hull of three-dimensional coordinates of a piece of laser point data included in the annotated obstacle point cloud. Therefore, the Jaccard similarity coefficient between the testing obstacle point cloud and the annotated obstacle point cloud can be calculated based on the following formula:

$$J(C_C, C_L) = \frac{|C_C \cap C_L|}{|C_C \cup C_L|} \qquad \text{(Formula 4)}$$

wherein $C_c$ denotes convex hull information of a three-dimensional convex hull included in the testing obstacle point cloud, for example, may be coordinates of a plurality of three-dimensional vertices corresponding to the three-dimensional convex hull;

$C_L$ denotes convex hull information of the three-dimensional convex hull included in the annotated obstacle point cloud, for example, may be coordinates of a plurality of three-dimensional vertices corresponding to the three-dimensional convex hull;

$|C_C \cap C_L|$ denotes a volume corresponding to the intersection of the three-dimensional convex hull included in the testing obstacle point cloud and the three-dimensional convex hull included in the annotated obstacle point cloud;

$|C_C \cup C_L|$ denotes a volume corresponding to the union of the three-dimensional convex hull included in the testing obstacle point cloud and the three-dimensional convex hull included in the annotated obstacle point cloud; and $L(C_C, C_L)$ is a Jaccard similarity coefficient between the testing obstacle point cloud and the annotated obstacle point cloud.

For example, when a testing obstacle point cloud and an annotated obstacle point cloud respectively includes a two-dimensional convex hull, here the two-dimensional convex hull of the testing obstacle point cloud may be a convex hull of two-dimensional coordinates (e.g., plane coordinates) of a piece of laser point data included in the testing obstacle point cloud. Similarly, the two-dimensional convex hull of the annotated obstacle point cloud may be a convex hull of two-dimensional coordinates (e.g., plane coordinates) of a piece of laser point data included in the annotated obstacle point cloud. Therefore, the Jaccard similarity coefficient between the testing obstacle point cloud and the annotated obstacle point cloud can be calculated based on the following formula:

$$J(C'_C, C'_L) = \frac{|C'_C \cap C'_L|}{|C'_C \cup C'_L|} \quad \text{(Formula 5)}$$

wherein $C'_C$ denotes convex hull information of the two-dimensional convex hull included in the testing obstacle point cloud, for example, may be coordinates of a plurality of two-dimensional vertices corresponding to the two-dimensional convex hull;

$C'_L$ denotes convex hull information of the two-dimensional convex hull included in the annotated obstacle point cloud, for example, may be coordinates of a plurality of two-dimensional vertices corresponding to the two-dimensional convex hull;

$|C'_C \cap C'_L|$ denotes an area corresponding to the intersection of the two-dimensional convex hull included in the testing obstacle point cloud and the two-dimensional convex hull included in the annotated obstacle point cloud;

$|C'_C \cup C'_L|$ denotes an area corresponding to the union of the two-dimensional convex hull included in the testing obstacle point cloud and the two-dimensional convex hull included in the annotated obstacle point cloud; and $J(C'_C, C'_L)$ is a Jaccard similarity coefficient between the testing obstacle point cloud and the annotated obstacle point cloud.

It may be appreciated that, when a testing obstacle point cloud and an annotated obstacle point cloud include other characteristic information, the Jaccard similarity coefficient between the testing obstacle point cloud and the annotated obstacle point cloud may be calculated similarly and would not be repeated any more here.

Step 304: generating the two obstacle point clouds and the similarity in the piece of sample data in the sample data set based on a similarity between the matching degree vectors of each of testing point cloud obstacles corresponding to one of two frames of sample point cloud and matching degree vectors of each of testing point cloud obstacles corresponding to the other one of the two sample point cloud frames having a location difference in the sample laser point cloud frame sequence being smaller than or equal to a preset number.

Specifically including:

Firstly, for two frames of sample laser point cloud having the location difference in the sample laser point cloud frame sequence smaller than the preset number (e.g., 1), a piece of sample data is generated for a first testing obstacle point cloud of at least one testing obstacle point cloud corresponding to one frame of sample laser point cloud and a second testing obstacle point cloud of the at least one testing obstacle point cloud corresponding to the other frame of sample laser point cloud of the two sample laser point cloud frames, the first testing obstacle point cloud and the second testing obstacle point cloud are defined as the two obstacle point clouds in the generated sample data, and a similarity between a matching degree vector corresponding to the first testing obstacle point cloud and a matching degree vector corresponding to the second testing obstacle point cloud is defined as the similarity of the generated sample data.

Optionally, the similarity between the matching degree vector corresponding to the first testing obstacle point cloud and the matching degree vector corresponding to the second testing obstacle point cloud may be an inner product, a Jaccard similarity coefficient or a cosine similarity degree between the matching degree vector corresponding to the first testing obstacle point cloud and the matching degree vector corresponding to the second testing obstacle point cloud.

Then, the predetermined sample data set is defined based on the generated at least one piece of sample data.

In some implementations, the generated at least one piece of sample data may be directly defined as the predetermined sample data set.

In some implementations, the predetermined sample data set may also be defined based on the generated at least one piece of sample data by:

firstly, a negative sample data set is generated based on sample data having a similarity smaller than or equal to a preset similarity threshold of the generated at least one piece of sample data.

Here, the preset similarity threshold may be preset, for example, may be set as 0.1 or 0.

Optionally, a negative sample data set may be directly generated by using the sample data having the similarity smaller than or equal to the preset similarity threshold of the generated at least one piece of sample data.

Optionally, a negative sample data set may also be generated by using the sample data having the similarity smaller than or equal to the preset similarity threshold of the generated at least one piece of sample data by:

firstly, generating the negative sample data set by using the sample data having the similarity smaller than or equal to the preset similarity threshold of the generated at least one piece of sample data; and then, deleting negative sample data having a low matching degree from the negative sample data set, wherein a characteristic point distance between two obstacle point clouds in the negative sample data having a low matching degree is greater than a preset distance threshold, or eigenvalues of a preset characteristic of the two obstacle point clouds in the negative sample data having a low matching degree are different. Here, the characteristic point distance between the two obstacle point clouds is a distance between a coordinate of a characteristic point corresponding to the one of the two obstacle point clouds and a coordinate of a characteristic point corresponding to the other one of the two obstacle point clouds. As an example, the coordinate of a characteristic point corresponding to an obstacle point cloud may be the coordinate of a center point or the coordinate of a gravity center point of an obstacle characterized by the obstacle point cloud. The eigenvalue of a preset characteristic of the obstacle point cloud may be an eigenvalue of a relevant characteristic of an obstacle represented by the obstacle point cloud. As an example, the eigenvalue of a preset characteristic of an obstacle point cloud may be an eigenvalue of a category characteristic of an obstacle. For example, the eigenvalue of the category characteristic of an obstacle may be: a motor vehicle, a person, a bicycle, or the like; and the eigenvalue of a shape characteristic of an obstacle may be: a cuboid, a cylinder, a conoid, or the like.

Thus, sample data having a low matching degree are deleted from the negative sample data set generated in this way, that is, two obstacle point clouds which are included in the negative sample data set and are obviously not used for characterizing an identical obstacle are deleted, i.e., negative sample data failing to contribute to training a similarity calculation model are deleted. Furthermore, the training of a similarity calculation model by using the negative sample data after the sample data having a low matching is deleted may reduce the calculation workload and training duration.

Secondly, a positive sample data set is generated based on sample data having a similarity greater than the preset similarity threshold of the generated at least one piece of sample data.

Optionally, a positive sample data set may be directly generated by using the sample data having the similarity greater than the preset similarity threshold of the generated at least one piece of sample data.

Optionally, a positive sample data set may also be generated by using the sample data having the similarity greater than the preset similarity threshold of the generated at least one piece of sample data by:

firstly, generating the positive sample data set using the sample data having the similarity greater than the preset similarity threshold of the generated at least one piece of sample data;

secondly, sorting positive sample data in the positive sample data set in an ascending order of the similarity in the sample data;

thirdly, calculating fractile distribution of the similarity of the positive sample data using a preset fractile (e.g., 10) based on a sorting result, and generating fractile results of the preset fractile; and finally, updating the similarity of the corresponding positive sample data in the positive sample data set using the generated fractile results of the preset fractile.

Therefore, the similarity in the positive sample data set generated in this way is more uniformly distributed, thereby enabling the trained similarity calculation model to calculate the similarity better.

A predetermined sample data set can be obtained through step 301 to step 304. Therefore, the similarity calculation model can be pre-trained using the sample data set.

The method provided by the embodiments of the present disclosure reduces labor and time cost problems as result of determining various parameters for calculating the similarity by importing a first obstacle point cloud and a second obstacle point cloud having a to-be-calculated similarity into a pre-trained similarity calculation model to generate a similarity between the first obstacle point cloud and the second obstacle point cloud, and outputting the generated similarity.

Figure 4:
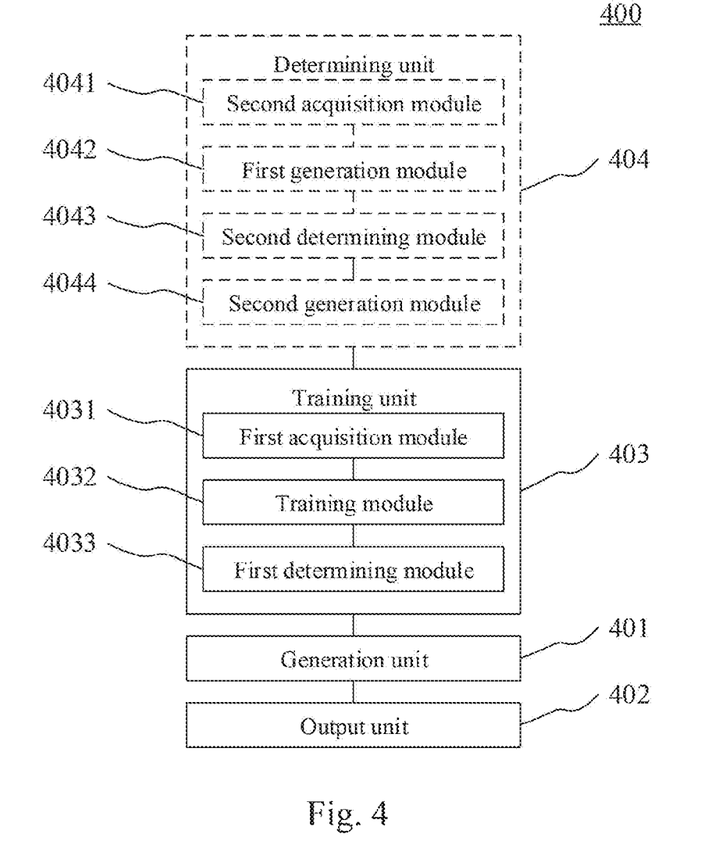
FIG. 4 is a structural schematic diagram of an apparatus for outputting information according to an embodiment of the present disclosure.

Further referring to FIG. 4, as implementations of the methods shown in the above figures, the disclosure provides an embodiment of an apparatus for outputting information. The embodiments of the apparatus correspond to the embodiments of the method shown in FIG. 2, and the apparatus may be specifically applied in a variety of electronic devices.

As shown in FIG. 4, an apparatus 400 for outputting information according to the embodiment includes: a generation unit 401, an output unit 402, and a training unit 403. The generation unit 401 is configured for importing a first obstacle point cloud and a second obstacle point cloud having a to-be-calculated similarity into a pre-trained similarity calculation model to generate a similarity between the first obstacle point cloud and the second obstacle point cloud, the similarity calculation model being used for characterizing corresponding relationship between two obstacle point clouds and a similarity; and the output unit 402 is configured for outputting the generated similarity; the similarity calculation model being obtained by a training unit 403, the training unit 403 including: a first acquisition module 4031, configured for acquiring an initial similarity calculation model and a predetermined sample data set, each piece of sample data including the two obstacle point clouds and the similarity between the two obstacle point clouds; a training module 4032, configured for training the initial similarity calculation model using a machine learning method with the two obstacle point clouds of each piece in sample data in the sample data set as input data, and the similarities in each piece of sample data as corresponding output data; and a first determining module 4033, configured for defining the trained initial similarity calculation model as the pre-trained similarity calculation model.

According to the embodiment, specific processing of the generation unit 401, the output unit 402, the training unit 403, the first acquisition module 4031, the training module 4032 and the first determining module 4033 of the apparatus 400 for outputting information and technical effects brought thereby may be respectively referred to in relevant description of the embodiment corresponding to FIG. 2 and would not be repeated any more here.

In some optional implementations of the embodiment, the sample data set may be obtained by a determining unit 404. The determining unit 404 may include: a second acquisition module 4041, configured for acquiring testing obstacle point clouds and annotated obstacle point clouds corresponding to each frame of sample laser point cloud in a sample laser point cloud frame sequence, wherein the annotated obstacle point cloud includes an obstacle identifier indicating a physical obstacle characterized by the annotated obstacle point cloud; a first generation module 4042, configured for generating an obstacle identifier set containing different obstacle identifiers in obstacle identifiers of the annotated obstacle point clouds corresponding to each frame of sample laser point cloud; a second determining module 4043, configured for determining, for each of the testing obstacle point clouds corresponding to a frame of sample laser point cloud frame, a matching degree vector having a preset number of dimensions and corresponding to the each testing obstacle point cloud based on a similarity between the each testing obstacle point cloud and each of the annotated obstacle point clouds corresponding to the each frame of sample laser point cloud, the preset number of dimensions being a number of the obstacle identifiers in the obstacle identifier set, a value of an element in the matching degree vector being a matching degree between the each testing obstacle point cloud and a physical obstacle indicated by each of the obstacle identifiers in the obstacle identifier set; and a second generation module 4044, configured for generating the two obstacle point clouds and the similarity in each piece of sample data in the sample data set based on a similarity between matching degree vectors of each of testing point cloud obstacles corresponding to one of two frames of sample point cloud and matching degree vectors of each of testing point cloud obstacles corresponding to the other one of the two frames of sample point cloud, the two frames of sample point cloud having a location difference in the sample laser point cloud frame sequence being smaller than or equal to a preset number.

In some optional implementations of the embodiment, the second generation module 4044 may include: a first determining submodule (not shown), configured for generating, for the two frames of sample laser point cloud having the location difference in the sample laser point cloud frame sequence being smaller than the preset number, a piece of sample data for a first testing obstacle point cloud of at least one testing obstacle point cloud corresponding to one of the two frames of sample laser point cloud and a second testing obstacle point cloud of the at least one testing obstacle point cloud corresponding to the other one of the two sample laser point cloud frames, defining the first testing obstacle point cloud and the second testing obstacle point cloud as the two obstacle point clouds in the generated sample data, and defining the similarity between the matching degree vector corresponding to the first testing obstacle point cloud and a matching degree vector corresponding to the second testing obstacle point cloud as the similarity of the generated sample data; and a second determining submodule (not shown), configured for defining the predetermined sample data set based on the generated at least one piece of sample data.

In some optional implementations of the embodiment, a similarity between a testing obstacle point cloud and an annotated obstacle point cloud may be a Jaccard similarity coefficient between the testing obstacle point cloud and the annotated obstacle point cloud.

In some optional implementations of the present embodiment, the similarity between the matching degree vector corresponding to the first testing obstacle point cloud and the matching degree vector corresponding to the second testing obstacle point cloud may be an inner product, a Jaccard similarity coefficient or a cosine similarity degree between the matching degree vector corresponding to the first testing obstacle point cloud and the matching vector corresponding to the second testing obstacle point cloud.

In some optional implementations of the present embodiment, the sample data set may include a positive sample data set having a similarity greater than a preset similarity threshold and a negative sample data set having a similarity smaller than or equal to the preset similarity threshold; and the second determining submodule may be further used for: generating the negative sample data set based on sample data having a similarity smaller than or equal to the preset similarity threshold of the generated at least one piece of sample data; and generating the positive sample data set based on sample data having a similarity greater than the preset similarity threshold of the generated at least one piece of sample data.

In some embodiments, the second determining submodule may be further used for: generating the positive sample data set using the sample data having the similarity greater than the preset similarity threshold of the generated at least one piece of sample data; sorting positive sample data in the positive sample data set in an ascending order of the similarity in the sample data; calculating fractile distribution of the similarity of the positive sample data using a preset fractile based on a sorting result, and generating fractile results of the preset fractile; and updating the similarity of the corresponding positive sample data in the positive sample data set using the generated fractile results of the preset fractile.

In some optional implementations of the embodiment, the second determining submodule may be further used for: generating the negative sample data set using the sample data having the similarity smaller than or equal to the preset similarity threshold of the generated at least one piece of sample data; and deleting negative sample data having a low matching degree in the negative sample data set, wherein a characteristic point distance between two obstacle point clouds in the negative sample data having a low matching degree is greater than a preset distance threshold, or eigenvalues of a preset characteristic of the two obstacle point clouds in the negative sample data having a low matching degree are different, and the characteristic point distance between the two obstacle point clouds is a distance between a coordinate of a characteristic point corresponding to one of the two obstacle point clouds and a coordinate of a characteristic point corresponding to the other one of the two obstacle point clouds.

It should be noted that implementation details and technical effects of the units in the apparatus for outputting information according to the embodiments of the present disclosure may be referred to in relevant description of the embodiment shown in FIG. 2 and would not be repeated any more here.

Please refer to FIG. 5 below, which shows a schematic diagram of a structure of a computer system 500 suitable for implementing the driving control device according to the embodiments of the present disclosure. The driving control device as shown in FIG. 5 is only an example, and should not limit the functions and usage range of the embodiments of the present disclosure in any way.

Figure 5:
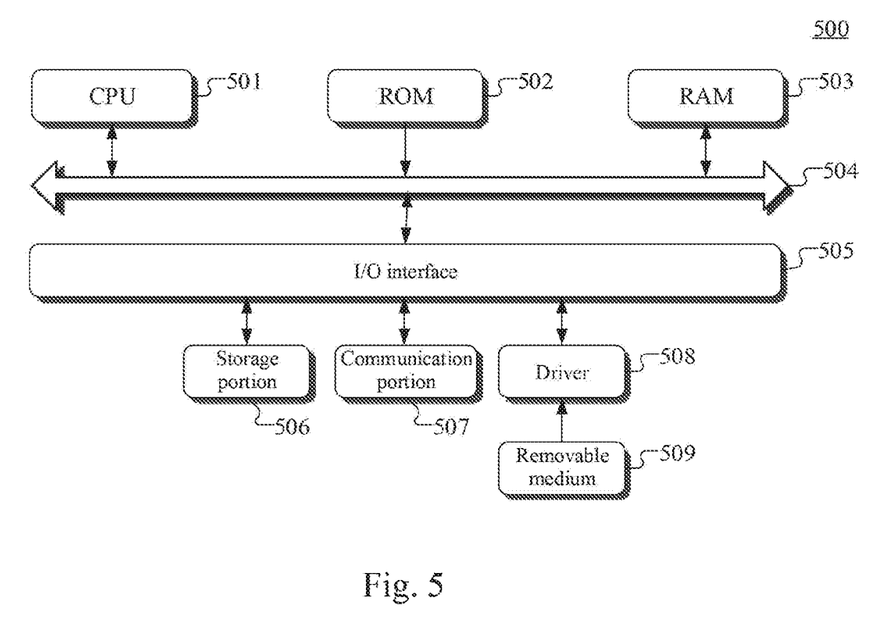
FIG. 5 is a schematic diagram of a structure of a computer system suitable for implementing a driving control device according to an embodiment of the present disclosure.

As shown in FIG. 5, the computer system 500 includes a central processing unit (CPU) 501, which may execute a variety of appropriate actions and processing in accordance with a program stored in a read only memory (ROM) 502 or a program loaded from a storage part 506 into a random access memory (RAM) 503. A variety of programs and data required by the operations of system 500 are also stored in the RAM 503. The CPU 501, the ROM 502 and the RAM 503 are connected to each other through a bus 504. An input/output (I/O) interface 505 is also connected to the bus 504.

The following components are connected to the I/O interface 505: a storage part 506 including a hard disk or the like; and a communication part 507 including a network interface card, such as a LAN card and a modem. The communication part 507 executes communication processing via a network, e.g., Internet. A driver 508 is also connected to the I/O interface 505 as required. A removable medium 509, such as a magnetic disc, an optical disc, or a semiconductor memory, is installed in the driver 508 as required, to facilitate a computer program read thereon to be installed in the storage part 506 as required.

In particular, according to embodiments of the present disclosure, the process described above with reference to the flow chart may be implemented in a computer software program. For example, an embodiment of the present disclosure includes a computer program product, which comprises a computer program embedded that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above-mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but, not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a generation unit and an output unit, where the names of these units or modules do not in some cases constitute a limitation to such units or modules themselves. For example, the generation unit may also be described as "a unit for generating a similarity."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: import a first obstacle point, cloud and a second obstacle point cloud having a to-be-calculated similarity into a pre-trained similarity calculation model to generate a similarity between the first obstacle point cloud and the second obstacle point cloud, the similarity calculation model being used for characterizing a corresponding relationship between the similarity and the two obstacle point clouds; output the generated similarity; the similarity calculation model being obtained through following training: acquire an initial similarity calculation model and a predetermined sample data set, each piece of sample data comprising the two obstacle point clouds and the similarity between the two obstacle point clouds; train the initial similarity calculation model using a machine learning method with the two obstacle point clouds in each piece of sample data in the sample data set as input data, and the similarities in each piece of sample data as corresponding output data; and define the trained initial similarity calculation model as the pre-trained similarity calculation model.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting information, comprising:
importing a first obstacle point cloud and a second obstacle point cloud having a to-be-calculated similarity into a pre-trained similarity calculation model to generate a similarity between the first obstacle point cloud and the second obstacle point cloud, the pre-trained similarity calculation model being used for characterizing a corresponding relationship between the similarity and the two obstacle point clouds;
outputting the generated similarity;
the pre-trained similarity calculation model being obtained through following training:
acquiring an initial similarity calculation model and a predetermined sample data set, each piece of sample data comprising the two obstacle point clouds and the similarity between the two obstacle point clouds;

training the initial similarity calculation model using a machine learning method with the two obstacle point clouds of a piece of sample data in the predetermined sample data set as input data, and the similarity in the piece of sample data as corresponding output data; and
defining the trained initial similarity calculation model as the pre-trained similarity calculation model.

2. The method according to claim 1, wherein the predetermined sample data set is obtained through:
acquiring testing obstacle point clouds and annotated obstacle point clouds corresponding to each frame of a sample laser point cloud in a sample laser point cloud frame sequence, wherein an annotated obstacle point cloud comprises an obstacle identifier indicating a physical obstacle characterized by the annotated obstacle point cloud;
generating an obstacle identifier set containing different obstacle identifiers in obstacle identifiers of the annotated obstacle point clouds corresponding to the each frame of the sample laser point cloud;
determining, for each of the testing obstacle point clouds corresponding to a frame of the sample laser point cloud, a matching degree vector having a preset number of dimensions and corresponding to a testing obstacle point cloud based on a similarity between each of the testing obstacle point clouds and each of the annotated obstacle point clouds corresponding to the frame of the sample laser point cloud, the preset number of dimensions being a number of the obstacle identifiers in the obstacle identifier set, a value of an element in the matching degree vector being a matching degree between the testing obstacle point cloud and a physical obstacle indicated by an obstacle identifier in the obstacle identifier set; and
generating the two obstacle point clouds and the similarity in the piece of sample data in the predetermined sample data set based on a similarity between matching degree vectors of each of the testing obstacle point clouds corresponding to one of two frames of the sample laser point cloud and matching degree vectors of each of the testing obstacle point clouds corresponding to the other one of the two frames of the sample laser point cloud, the two frames of the sample laser point cloud having a location difference in the sample laser point cloud frame sequence being smaller than or equal to a preset number.

3. The method according to claim 2, wherein the generating the two obstacle point clouds and the similarity in the piece of sample data in the predetermined sample data set based on a similarity between matching degree vectors of each of the testing obstacle point clouds corresponding to one of the two frames of the sample laser point cloud and matching degree vectors of each of the testing obstacle point clouds corresponding to the other one of the two frames of the sample laser point cloud, the two frames of the sample laser point cloud having a location difference in the sample laser point cloud frame sequence being smaller than or equal to a preset number comprises:
generating at least one piece of sample data, for the two frames of the sample laser point cloud having the location difference in the sample laser point cloud frame sequence being smaller than the preset number, wherein a piece of sample data in the at least one piece of sample data is generated based on a first testing obstacle point cloud of at least one testing obstacle point cloud corresponding to the one of the two frames of the sample laser point cloud and a second testing obstacle point cloud of at least one testing obstacle point cloud corresponding to the other one of the two frames of the sample laser point cloud, defining the first testing obstacle point cloud and the second testing obstacle point cloud as the two obstacle point clouds in the generated piece of sample data, and defining the similarity between the matching degree vector corresponding to the first testing obstacle point cloud and a matching degree vector corresponding to the second testing obstacle point cloud as a similarity of the generated piece of sample data; and
defining the predetermined sample data set based on the generated at least one piece of sample data.

4. The method according to claim 3, wherein the similarity between each of the testing obstacle point clouds and each of the annotated obstacle point clouds is a Jaccard similarity coefficient between the each of the testing obstacle point clouds and the each of the annotated obstacle point clouds.

5. The method according to claim 4, wherein the similarity between the matching degree vector corresponding to the first testing obstacle point cloud and the matching degree vector corresponding to the second testing obstacle point cloud is an inner product, a Jaccard similarity coefficient or a cosine similarity between the matching degree vector corresponding to the first testing obstacle point cloud and the matching degree vector corresponding to the second testing obstacle point cloud.

6. The method according to claim 5, wherein the predetermined sample data set comprises a positive sample data set having a similarity greater than a preset similarity threshold and a negative sample data set having a similarity smaller than or equal to the preset similarity threshold; and
the defining the predetermined sample data set based on the generated at least one piece of sample data comprises:
generating a negative sample data set based on sample data, having a similarity smaller than or equal to the preset similarity threshold of the generated at least one piece of sample data; and
generating a positive sample data set based on sample data having a similarity greater than the preset similarity threshold of the generated at least one piece of sample data.

7. The method according to claim 6, wherein the generating a positive sample data set based on sample data having a similarity greater than the preset similarity threshold of the generated at least one piece of sample data comprises:
generating the positive sample data set using the sample data having the similarity greater than the preset similarity threshold of the generated at least one piece of sample data;
sorting pieces of positive sample data in the generated positive sample data set in an ascending order of similarity in the pieces of positive sample data;
calculating fractile distribution of the similarity of the pieces of positive data using a preset fractile based on a sorting result, and generating fractile results of the preset fractile; and
updating a similarity of a corresponding piece of positive sample data in the generated positive sample data set using the generated fractile results of the preset fractile.

8. The method according to claim 7, wherein the generating the negative sample data set based on sample data having a similarity smaller than or equal to the preset similarity threshold of the generated at least one piece of sample data comprises:

generating, the negative sample data set using the sample data having the similarity smaller than or equal to the preset similarity threshold of the generated at least one piece of sample data; and deleting negative sample data having a low matching degree from the generated negative sample data set, wherein a characteristic point distance between two obstacle point clouds in the negative sample data having a low matching degree is greater than a preset distance threshold, or eigenvalues of a preset characteristic of the two obstacle point clouds in the negative sample data having a low matching degree are different, and the characteristic point distance between the two obstacle point clouds is a distance between a coordinate of a characteristic point corresponding to one of the two obstacle point clouds and a coordinate of a characteristic point corresponding to the other one of the two obstacle point clouds.

9. An apparatus for outputting information, comprising:
at least one processor; and
a memory storing instructions, the instructions when executed by the at least one processor, cause the at least one processor to perform operations, the operations comprising:
importing a first obstacle point cloud and a second obstacle point cloud having a to-be-calculated similarity into a pre-trained similarity calculation model to generate similarity between the first obstacle point cloud and the second obstacle point cloud, the pre-trained similarity calculation model being used for characterizing a corresponding relationship between the similarity and the two obstacle point clouds;
outputting the generated similarity;
the pre-trained similarity calculation model being obtained through following training:
acquiring an initial similarity calculation model and a predetermined sample data set, each piece of sample data comprising the two obstacle point clouds and the similarity between the two obstacle point clouds;
training the initial similarity calculation model using a machine learning method with the two obstacle point clouds of a piece of sample data in the predetermined sample data set as input data, and the similarity in the piece of sample data as corresponding output data; and
defining the trained initial similarity calculation model as the pre-trained similarity calculation model.

10. The apparatus according to claim 9, wherein the predetermined sample data set is obtained through:
acquiring testing obstacle point clouds and annotated obstacle point clouds corresponding to each frame of a sample laser point cloud in a sample laser point cloud frame sequence, wherein an annotated obstacle point cloud comprises an obstacle identifier indicating a physical obstacle characterized by the annotated obstacle point cloud;
generating an obstacle identifier set containing different obstacle identifiers in obstacle identifiers of the annotated obstacle point clouds corresponding to the each frame of the sample laser point cloud;
determining, for each of the testing obstacle point clouds corresponding to a frame of the sample laser point cloud, a matching degree vector having a preset number of dimensions and corresponding to a testing obstacle point cloud based on a similarity between each of the testing obstacle point clouds and each of the annotated obstacle point clouds corresponding to the frame of the sample laser point cloud, the preset number of dimensions being a number of the obstacle identifiers in the obstacle identifier set, a value of an element in the matching degree vector being a matching degree between the testing obstacle point cloud and a physical obstacle indicated by an obstacle identifier in the obstacle identifier set; and generating the two obstacle point clouds and the similarity in the piece of sample data in the predetermined sample data set based on a similarity between matching degree vectors of each of the testing obstacle point clouds corresponding to one of two frames of the sample laser point cloud and matching degree vectors of each of the testing obstacle point clouds corresponding to the other one of the two frames of the sample laser point cloud, the two frames of the sample laser point cloud having a location difference in the sample laser point cloud frame sequence being smaller than or equal to a preset number.

11. The apparatus according to claim 10, wherein the generating the two obstacle point clouds and the similarity in the piece of sample data in the predetermined sample data set based on a similarity between matching degree vectors of each of the testing obstacle point clouds corresponding to one of the two frames of the sample laser point cloud and matching degree vectors of each of the testing obstacle point clouds corresponding to the other one of the two frames of the sample laser point cloud, the two frames of the sample laser point cloud having a location difference in the sample laser point cloud frame sequence being smaller than or equal to a preset number comprises:
generating at least one piece of sample data, for the two frames of the sample laser point cloud having the location difference in the sample laser point cloud frame sequence being smaller than the preset number, wherein a piece of sample data in the at least one piece of sample data is generated based on a first testing obstacle point cloud of at least one testing obstacle point cloud corresponding to the one of the two frames of the sample laser point cloud and a second testing obstacle point cloud of at least one testing obstacle point cloud corresponding to the other one of the two frames of the sample laser point cloud, defining the first testing obstacle point cloud and the second testing obstacle point cloud as the two obstacle point clouds in the generated piece of sample data, and defining the similarity between the matching degree vector corresponding to the first testing obstacle point cloud and a matching degree vector corresponding to the second testing obstacle point cloud as a similarity of the generated piece of sample data; and
defining the predetermined sample data set based on the generated at least one piece of sample data.

12. The apparatus according to claim 11, wherein the similarity between each of the testing obstacle point clouds and each of the annotated obstacle point clouds is a Jaccard similarity coefficient between the each of the testing obstacle point clouds and the each of the annotated obstacle point clouds.

13. The apparatus according to claim 12, wherein the similarity between the matching degree vector corresponding to the first testing obstacle point cloud and the matching degree vector corresponding to the second testing obstacle point cloud is an inner product, a Jaccard similarity coefficient or a cosine similarity between the matching degree vector corresponding to the first testing obstacle point cloud and the matching degree vector corresponding to the second testing obstacle point cloud.

14. The apparatus according to claim 13, wherein the predetermined sample data set comprises a positive sample data set having a similarity greater than a preset similarity threshold and a negative sample data set having a similarity smaller than or equal to the preset similarity threshold; and
the defining the predetermined sample data set based on the generated at least one piece of sample data comprises:
generating a negative sample data set based on sample data having a similarity smaller than or equal to the preset similarity threshold of the generated at least one piece of sample data; and
generating a positive sample data set based on sample data having a similarity greater than the preset similarity threshold of the generated at least one piece of sample data.

15. The apparatus according to claim 14, wherein the generating a positive sample data set based on sample data having a similarity greater than the preset similarity threshold of the generated at least one piece of sample data comprises:
generated the positive sample data set using the sample data having the similarity greater than the preset similarity threshold of the generated at least on piece of sample data;
sorting pieces of positive sample data in the generated positive sample data set in an ascending order of similarity in the pieces of positive sample data;
calculating fractile distribution of the similarity of the pieces of positive sample data using a preset fractile based on a sorting result, and generating fractile results of the preset fractile; and
updating a similarity of a corresponding piece of positive sample data in the generated positive sample data set using the generated fractile results of the preset fractile.

16. The apparatus according to claim 15, wherein the generating the negative sample data set based on sample data having a similarity smaller than or equal to the preset similarity threshold of the generated at least one piece of sample data comprises:
generating the negative sample data set using the sample data having the similarity smaller than or equal to the preset similarity threshold of the generated at least one piece of sample data; and
deleting negative sample data having a low matching degree from the generated negative sample data set, wherein a characteristic point distance between two obstacle point clouds in the negative sample data having a low matching degree is greater than a preset distance threshold, or eigenvalues of a preset characteristic of the two obstacle point clouds in the negative sample data having a low matching degree are different, and the characteristic point distance between the two obstacle point clouds is a distance between a coordinate of a characteristic point corresponding to one of the two obstacle point clouds and a coordinate of a characteristic point corresponding to the other one of the two obstacle point clouds.

17. A non-transitory computer readable storage medium storing a computer program, wherein the computer program, when executed by a processor, cause the processor to perform operations, the operation comprising:
importing a first obstacle point cloud and a second obstacle point cloud having a to-be-calculated similarity into a pre-trained similarity calculation model to generate a similarity between the first obstacle point cloud and the second obstacle point cloud, the pre-trained similarity calculation model being used for characterizing a corresponding relationship between the similarity and the two obstacle point clouds;
outputting the generated similarity;
the pre-trained similarity calculation model being obtained through following training:
acquiring an initial similarity calculation model and a predetermined sample data set, each piece of sample data comprising the two obstacle point clouds and the similarity between the two obstacle point clouds;
training the initial similarity calculation model using a machine learning method with the two obstacle point clouds of a piece of sample data in the predetermined sample data set as input data, and the similarity in the piece of sample data as corresponding output data; and
defining the trained initial similarity calculation model as the pre-trained similarity calculation model.

\* \* \* \* \*